(12) United States Patent
Rudie et al.

(10) Patent No.: US 7,097,871 B2
(45) Date of Patent: Aug. 29, 2006

(54) DEFLAVORED VEGETABLE POWDERS, METHODS OF MAKING THEM, AND SYSTEMS FOR VEGETABLE MILLING

(75) Inventors: Noel Rudie, Oskaloosa, IA (US); Brent Sorenson, Fertile, MN (US)

(73) Assignee: SoyLink, Oskaloosa, IA (US)

( * ) Notice: Subject to any disclaimer, the term of this patent is extended or adjusted under 35 U.S.C. 154(b) by 209 days.

(21) Appl. No.: 10/718,186

(22) Filed: Nov. 19, 2003

(65) Prior Publication Data

US 2005/0106308 A1    May 19, 2005

(51) Int. Cl.
  A23L 1/015    (2006.01)
  A23L 1/10     (2006.01)
  A23L 1/20     (2006.01)

(52) U.S. Cl. .............. 426/524; 426/482; 426/518; 426/520; 426/615; 426/618; 426/634

(58) Field of Classification Search ........... 426/482, 426/518, 520, 524, 615, 618, 634
See application file for complete search history.

(56) References Cited

U.S. PATENT DOCUMENTS

| | | | |
|---|---|---|---|
| 4,152,465 A | 5/1979 | Kijima et al. | |
| 4,205,094 A | 5/1980 | Baird et al. | |
| 4,211,694 A | 7/1980 | Youngquist | |
| 4,409,256 A | 10/1983 | Johnson et al. | |
| 4,637,556 A * | 1/1987 | Dunn | 241/48 |
| 4,642,236 A | 2/1987 | Friend et al. | |
| 4,748,038 A | 5/1988 | Lewis et al. | |
| 4,859,482 A | 8/1989 | Gavin et al. | |
| 5,233,765 A * | 8/1993 | Schaarschmidt | 34/394 |
| 6,313,273 B1 | 11/2001 | Thomas et al. | |
| 6,426,112 B1 | 7/2002 | Boatright | |
| 2001/0026831 A1 | 10/2001 | Iwamoto | |
| 2002/0004095 A1 | 1/2002 | Whalen | |

FOREIGN PATENT DOCUMENTS

| | | |
|---|---|---|
| JP | 4304858 | 10/1992 |
| JP | 7241179 | 9/1995 |
| JP | 9252738 | 9/1997 |
| JP | 2001169741 | 6/2001 |

OTHER PUBLICATIONS

Boatright et al., "Factors Influencing the Occurrence of Methanethiol in Aqueous Slurries of Soy Protein Concentrates", *Journal of Food Science*, 68(5):1568-1572 (2003).

Haumen, "Soymilk: New processing, packaging expand markets", *Journal of the American Oil Chemists' Society*, 61:1784-1793(Dec. 1984).

Iwuoha et al., "Chemical, physical and sensory characteristics of soymilk as affected by processing method, temperature and duration of storage", *Food Chemistry*, 59(3):373-379 (1997).

(Continued)

*Primary Examiner*—Helen Pratt
(74) *Attorney, Agent, or Firm*—Merchant & Gould PC

(57) ABSTRACT

The present invention relates to vegetable powders and methods of making them. The methods can include one or more inventive methods of dehulling, steaming, and/or milling and air classifying a millable vegetable. The vegetable powders can have improved processing characteristics, enhanced nutritional value, and/or improved flavor compared to conventional vegetable powders.

24 Claims, 3 Drawing Sheets

OTHER PUBLICATIONS

Johnson et al., "Influence of soybean variety and the method of processing in tofu manufacturing: Comparison of methods for measuring soluble solids in soymilk", *Journal of Food Science*, 49(1):202-204 (Jan./Feb. 1984) (Abstract only).

Lee et al., "Formation of Volatile Compounds in Soy Flour by Singlet Oxygen Oxidation During Storage Under Light", *Journal of Food Science*, 68(6):1933-1937 (2003).

Lusas et al., "Soy protein products: processing and use", *The Journal of Nutrition*, 125(35):573S-580S (Mar. 1995) (Abstract only).

Miskovsky et al., "Effects of Processing on Curd Yield and Nutrient Composition of Rapid Hydration Hydrothermal Cooking and Traditionally Processed Soymilk and Soybean Curd", *Journal of Food Science*, 52(6):1542-1544 (1987).

Moizuddin et al., "Tofu production from soybeans or full-fat soyflakes using direct and indirect heating processes", *Journal of Food Science*, 64(1):145-148 (Jan./Feb. 1999) (Abstract only).

Nelson et al., "Illinois Process for Preparation of Soymilk", *Journal of Food Science*, 41:57-61 (1976).

Ogundipe et al., "Soymilk Yield and Quality as Affected by Soybean Varieties and Processing Techniques", *Tropical Grain Legume Bullentin*, 36:12-14 (1989).

Rahma et al., "Soybean—effect of soaking and different heat treatments on chemical composition, functional properties and utilization in food products", *Food Sci. Dep.*, 14(1):25-33 (1988) (Abstract only).

Sharkasi, "Effect of processing on structure and functional properties of soybean storage proteins", *Dissertation Abstracts International*, 45(10):3131 (1985) (Abstract only).

Zammer, "Has soy been milked for all it's worth?", *Food Processing's Wellness Foods*, pp. 24-26 (Jul./Aug. 2003).

Kice Aspirator Brochure, "Multi-Aspirator", undated.

"Kurimoto Power System—Whizzer Separator", www.kurimoto.co.jp/engl/machinery/powdersystem/product/WhizzerSeparator.html (Aug. 7, 2003).

\* cited by examiner

DEFLAVORED VEGETABLE POWDERS, METHODS OF MAKING THEM, AND SYSTEMS FOR VEGETABLE MILLING

FIELD OF THE INVENTION

The present invention relates to vegetable powders, methods of making them, and systems for vegetable milling. The vegetable powders can have improved processing characteristics, enhanced nutritional value, and/or improved flavor compared to conventional vegetable powders. The methods can include one or more inventive methods of dehulling, steaming, and/or milling and air classifying a millable vegetable. The systems for vegetable milling can include an inventive configuration of steaming, milling, and classifying apparatus together with air handling systems.

BACKGROUND OF THE INVENTION

Vegetable powders are produced using a variety of known methods and are used as a base for many food products. While existing vegetable powders are used to create many different food products, most of them have an off odor and taste, chalky feel, and low protein content due to the method used to make the powder.

Soymilk, for example, has great potential, but has yet to catch on in the west. Soymilk is lactose and cholesterol free, nutritious, and healthful. It has traditionally been a staple of the Chinese diet. In the United States, soymilk has not been well received. Soymilk is traditionally made by soaking soybeans, grinding them with water, cooking the slurry, filtering the slurry to remove the sludge, and then heating the extract. This process results in a beverage that has an off-flavor and odor which many cultures simply do not accept.

To make soymilk more appealing to consumers, its processing and deflavoring has been a topic of research in the United States for decades. Many researchers have been left frustrated trying to sufficiently reduce the off-flavor and odor and chalkiness of conventional soymilk. Several researchers have attempted to develop a powdered soy beverage adaptable to the tastes of diverse cultures, but many of these resulted in a soymilk with a low protein content and a bland, chalky taste. For example, bad flavor can be reduced by boiling soybeans, and this is exploited in the "Illinois" method. However, boiled beans still yield a product with bad mouth feel, chalkiness, and/or low protein content.

There remains a need for a vegetable powder that has or can make products with commercially acceptable flavor, mouth feel, and/or protein content.

SUMMARY OF THE INVENTION

The present invention relates to vegetable powders, methods of making them, and systems for vegetable milling. The vegetable powders can have improved processing characteristics, enhanced nutritional value, and/or improved flavor compared to conventional vegetable powders. The methods can include one or more inventive methods of dehulling, steaming, and/or milling and air classifying a millable vegetable. The systems for vegetable milling can include an inventive configuration of steaming, milling, and classifying apparatus together with air handling systems.

The present invention includes a vegetable powder. The vegetable powder can be composed of particles, at least about 80% of the particles can have a size below about 10 to about 30 μm. The vegetable powder can have a mean particle size of about 10 μm.

The vegetable powder can yield an aqueous homogenate that has flavor rank indicating flavor superior to that of conventional vegetable powders. For example, the vegetable powder can have a flavor rank indicating a good, nutty, pleasant soy flavor, which can correspond to a numerical rank of about 8.5 or more. This rank can be based on flavor scale on which the lowest rank (1) indicates green beany flavor and the highest rank (10) indicates fresh and pleasant flavor.

The vegetable powder can yield an aqueous homogenate that has off taste rank indicating flavor superior to that of conventional vegetable powders. For example, the vegetable powder can have a off taste rank indicating off taste of slightly oxidized, slight cardboard, or somewhat green off taste, which can correspond to a numerical rank of about 3 or lower. This rank can be based on an off taste scale on which the lowest rank (1) indicates the lowest amount of off taste and no rancid taste and the highest rank (10) indicates the highest amount of off taste and maximum rancidity.

The present method can include a method of producing vegetable powder. The method can include contacting millable vegetable with steam at about 95° C. to about 130° C. for about 3 to about 12 min, milling the millable vegetable, and producing vegetable powder of which 70% has a particle size less than 20 microns. The method can include milling millable vegetable with milling including contacting the vegetable with air previously passed through a cooling apparatus during milling, contacting the vegetable with air previously passed through a drying apparatus during milling, or a combination thereof.

The method can include milling millable vegetable and simultaneously with milling, classifying the milled vegetable. The classifying can include contacting the vegetable with air previously passed through a cooling apparatus during classifying, contacting the vegetable with air from a drying apparatus during classifying, or a combination thereof.

The method can include dehulling the millable vegetable. The dehulling can include dehulling vegetable having a mixture of sizes, gently drying the vegetable and dehulling the gently dried vegetable, dehulling at ambient temperature, or a combination thereof.

The present system can include a system for producing vegetable powder. The system can include steaming apparatus, milling apparatus, classifying apparatus, air cooling apparatus, and air drying apparatus. The system can also include vegetable handling apparatus and/or air handling apparatus. The air handling apparatus can be configured to transport the air from the cooling apparatus and/or drying apparatus to the milling apparatus, to the vegetable handling apparatus between the milling apparatus and the classifying apparatus, and/or to the classifying apparatus.

DETAILED DESCRIPTION OF THE INVENTION

Definitions

Figure 1:
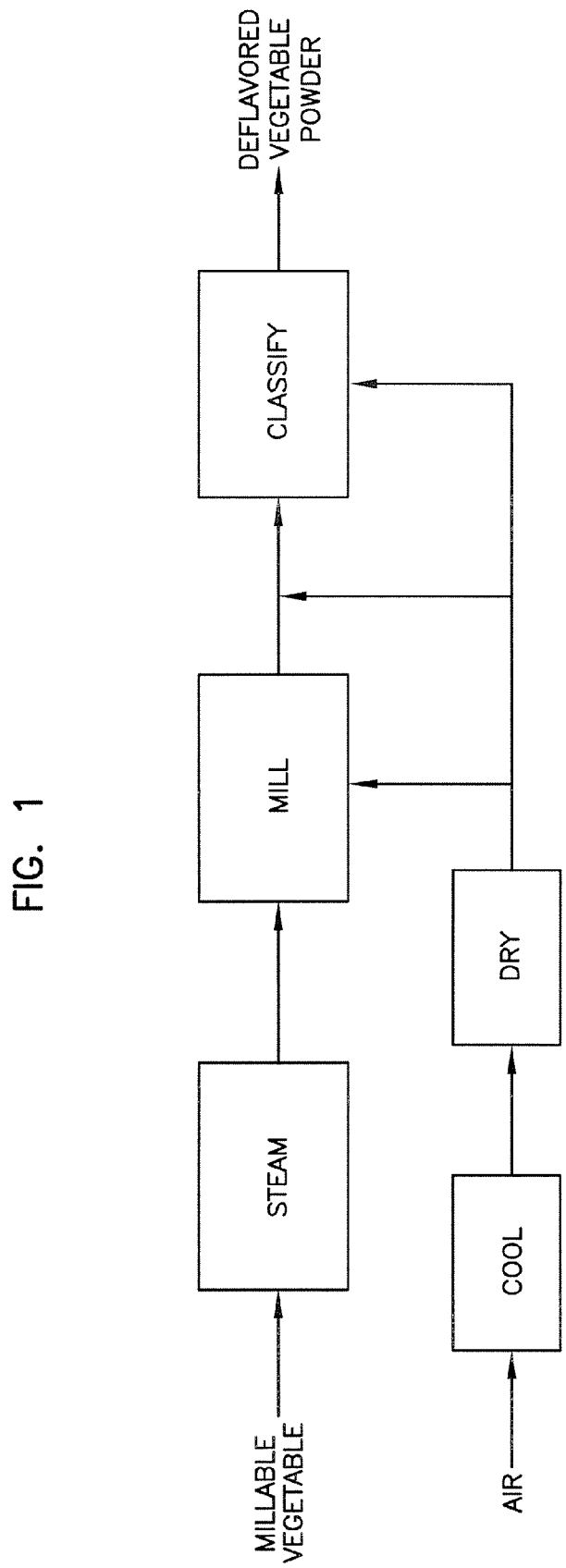
FIG. 1 schematically illustrates an embodiment of the method of the present invention including steaming, milling, and/or classifying.

As used herein, "millable vegetable" refers to any vegetable that can be milled into a powder and that can benefit from a deflavoring treatment, and to parts of these vegetables. Millable vegetables include legumes (e.g., oleaginous and non-oleaginous legumes), grains (e.g., cereal grains), seeds of these millable vegetables, and the like. Legumes include black beans, pinto beans, red beans, broad beans, lentils, soybeans (e.g., whole soybeans, soybean germ, or soybean cotyledon), navy beans, and peas.

As used herein, "deflavoring" refers to reducing or removing objectionable flavor notes characteristic of millable vegetables, such as soybeans.

As used herein, the term "about" modifying the quantity of an ingredient in the compositions of the invention or employed in the methods of the invention refers to variation in the numerical quantity that can occur, for example, through typical processing and measuring procedures used for making and evaluating vegetable powders in the real world; through inadvertent error in these procedures; through differences in the manufacture, source, or purity of the ingredients or apparatus employed to make the powders or carry out the methods; and the like. Whether or not modified by the term "about", the claims include equivalents to the quantities.

Vegetable Powder

The present invention relates to an improved vegetable powder, e.g., a powdered millable vegetable. Compared to conventional vegetable powders, such a vegetable powder can have one or more of improved processing characteristics, enhanced nutritional value, and/or improved flavor. In certain embodiments, the present vegetable powder has one or more of improved flavor, reduced off-taste and/or off-smell, and improved mouth feel. Such vegetable powders can be produced by the present method.

In an embodiment, the present vegetable powder or product containing or made from the present vegetable powder can have flavor rated better than the flavor of conventional vegetable powders and products made from the conventional powders. Flavor can be evaluated by any of a variety of known methods. For example, the present vegetable powder or product made from it can be evaluated for flavor by a flavor panel according to a standard scale of flavor.

In an embodiment, flavor can be evaluated by producing an aqueous suspension or homogenate of the vegetable powder and ranking the flavor of the suspension or homogenate on a flavor scale. Such a scale can, for example, rank soybean (e.g., soy powder or soy milk) flavors from 1 to 10 with, for example, 1 being the lowest rank and indicating a rancid flavor; a rank of 2 indicating a painty flavor; a rank of 3 indicating a rancid and sour flavor; a rank of 4 indicating a soapy flavor; a rank of 5 indicating an obviously green and beany flavor, an unpleasant soy flavor; a rank of 6 indicating little beany flavor, flat soy flavor; a rank of 7 indicating a slightly beany flavor and little nutty flavor; a rank of 8 indicating good, nutty, clean soymilk flavor; a rank of 9 indicating a bland flavor; and 10 being the highest rank and indicating a fresh and pleasant flavor. A conventional vegetable powder can yield a suspension or homogenate with a flavor ranking below 5. A vegetable powder according to the present invention yields a suspension or homogenate with a flavor ranking of at least 7, at least 8, at least 8.5, or at least 9.

In an embodiment, the present vegetable powder or product containing or made from the present vegetable powder can have reduced off taste compared to conventional vegetable powders and products made from the conventional powders. Off taste can be evaluated by any of a variety of known methods. For example, the present vegetable powder or product made from it can be evaluated for off taste by a flavor panel according to a standard scale of off taste.

In an embodiment, off taste can be evaluated by producing an aqueous suspension or homogenate of the vegetable powder and ranking the off taste of the suspension or homogenate on a scale. Such a scale can, for example, rank soybean (e.g., soy powder or soy milk) off tastes from 1 to 10 with 1 indicating the lowest amount of off taste, e.g., no rancid taste, and 10 indicating the highest amount of off taste, e.g., maximum rancidity. According to this scale, rank and off taste correspond as: 1, no rancid taste; 2, slightly bitter off taste; 3, slightly oxidized, slight cardboard, or somewhat green off taste; 4, slightly cooked off taste; 5, metallic off taste; 6, beany off taste; 8, soapy off taste; 9, painty off taste; and 10, very rancid off taste. A vegetable powder according to the present invention yields a suspension or homogenate with a off taste ranking of less than or equal to 4, less than or equal to 2, or less than or equal to 1.

In an embodiment, the present vegetable powder or product containing or made from the present vegetable powder can have color rated better than the color of conventional vegetable powders and products made from the conventional powders. Color can be evaluated by any of a variety of known methods. For example, the present vegetable powder or product made from it can be evaluated for color by a color panel according to a standard scale of color.

In an embodiment, the present vegetable powder has advantageously small size. For example, the present vegetable powder can have a mean particle size of about 5 to about 15 µm, about 10 to about 15 µm, or about 8 to about 15 µm, or about 10 µm. In an embodiment, the present vegetable powder includes at least about 70% particles of size below about 20 µm. In an embodiment, the present vegetable powder includes at least about 80% particles of size below about 20 µm. In an embodiment, the present vegetable powder includes at least about 90% particles of size below about 20 µm. In certain embodiments, the present vegetable powder includes at least about 80% particles of size below about 20 µm, less than about 15 µm, or less than about 10 µm. In an embodiment, the present vegetable powder includes at least about 95% particles of size below about 20 to about 25 µm.

In an embodiment, the small size of the present vegetable powder can be described with reference to the mouth feel or astringency of the powder. For example, the present vegetable powder can be of a size such that consumers perceive it to lack a gritty texture. For example, the present vegetable powder can be of a size such that consumers perceive it to lack astringency or mouth drying. Such advantageous characteristics can be achieved with a powder including at least about 70% particles of size below about 20 µm. In an embodiment, these advantageous characteristics can be achieved with a powder including at least about 80% particles of size below about 20 µm.

In an embodiment, the present vegetable powder or product containing or made from the present vegetable powder can have enhanced nutritional value compared to conventional vegetable powders and products made from the conventional powders. Nutritional value can be evaluated by any of a variety of known methods. Nutritional value can be reflected in measurements such as protein dispersiblity, trypsin inhibitor levels, and the like.

For example, nutritional value of the present vegetable powder or product made from it can be evaluated by determining the level of trypsin inhibitor. Lower levels of trypsin inhibitor can advantageously correspond to increased nutritional value. In an embodiment, the present vegetable powder has advantageously low levels of trypsin inhibitor. For example, the present vegetable powder can have levels of trypsin inhibitor of less than or equal to about 40% that of the raw vegetable, less than or equal to about 50% that of the raw vegetable, or less than or equal to about 60% that of the raw vegetable. For example, the present vegetable powder can have levels of trypsin inhibitor of less than or equal to about 2,000 TIU/g (see, e.g., AOCS Ba112-75), less than or equal to about 20,000 TIU/g, or less than or equal to about 30,000 TIU/g that of the raw vegetable.

For example, aspects of the functional value of the present vegetable powder or product made from it can be evaluated by determining the level of protein dispersibility. In an embodiment, the present vegetable powder has advantageously high protein dispersibility. For example, the present vegetable powder can have protein dispersibility of greater than or equal to about 60% that of the raw vegetable, greater than or equal to about 70% that of the raw vegetable, or greater than or equal to about 80% that of the raw vegetable. Comparison of the protein dispersibility of the raw vegetable and the vegetable powder can be accomplished by comparing the protein dispersibility index (PDI) for each sample.

In an embodiment, the present vegetable powder or product containing or made from the present vegetable powder can have increased shelf life compared to conventional vegetable powders and products made from the conventional powders. Shelf life can be evaluated by any of a variety of known methods. For example, shelf life of the present vegetable powder or product made from it can be determined by comparisons of the aging or shelf life of samples of vegetable powders made by different methods or from different materials. For example, at the end of useful shelf life the vegetable powder has undesirable characteristics such as oxidative lipid rancidity, sulfur (e.g., methane thiol or dimethyl trisulfide) flavors, or cardboard, burnt feather, soapy, painty, beany, or green flavors.

Processing Millable Vegetables

The present invention also relates to an inventive method for producing vegetable powder. This method can include an inventive dehulling process, an inventive steaming process, and/or an inventive milling process. FIG. 1 schematically illustrates an embodiment of the method of the present invention including steaming, milling, and/or classifying. The present method can operate on any of a variety of millable vegetables. In certain embodiments, the present methods and systems operate on millable legumes, such as soybean, black bean, pinto bean. In an embodiment, the present methods and systems operate operates on soybean.

Providing Millable Vegetable

The present method can include providing raw millable vegetable or providing millable vegetable that has been prepared for one or more of dehulling, steaming, or milling. Before operation of the present method, the millable vegetable can be subject to, for example, transporting, receiving, storing, grading, sorting, washing, drying, cleaning, cold expressing, or other conventional processes that can prepare a millable vegetable for further processing, e.g., dehulling, steaming, or milling. In an embodiment, preparing a millable vegetable for one or more of dehulling, steaming, or milling can include transporting, receiving, storing, cleaning, sorting, and/or drying the millable vegetable.

For example, the present method can include storing and/or sorting food grade millable vegetables before processing, e.g., before dehulling. In an embodiment, food grade millable vegetable can be subject to one or more of: storing in a large tank, passing through a magnetic field (e.g., to remove metal objects), and loading into a sorting device (e.g., a gravity table, a color sorter, or the like).

A sorting device such as a gravity table can remove debris and unwanted vegetable matter from the desired millable vegetables. A gravity table can sort material by physical properties including density and particle size, and are used widely in seed conditioning. A gravity table can separate shriveled and/or broken millable vegetables from intact and usable millable vegetables.

A color sorter can distinguish vegetables by their hue, color intensity and color brightness. For example, color sorters can accurately identify and remove off-colored soybeans. Thus, a color sorter can remove green tinted immature soybeans and soybeans with an unclean seed coat, with mosaic virus, or with another seed coat disease.

Dehulling Millable Vegetables

In an embodiment, the present method includes an inventive process for dehulling a millable vegetable having a hull. Dehulling can include removing the skin (hull) of the millable vegetable from its meat or cotyledon. Dehulling soybeans or another legume can remove the hull and a small amount of germ. Known dehulling apparatus and processes can halve or quarter the cotyledons or meats (e.g., producing material larger than 8 mesh). In an embodiment, dehulling can produce material as small as 20 mesh. The present methods of dehulling can employ known dehulling apparatus (e.g., a cracking mill) and known dehulling methods. The present methods of dehulling can also include dehulling vegetable having a mixture of sizes, gently drying the vegetable and dehulling the gently dried vegetable, dehulling at ambient temperature, or a combination thereof.

Conventional dehulling typically requires that the vegetable to be dehulled (e.g., soybean) be sorted or restricted to a uniform size. In contrast, the present method can include dehulling a millable vegetable (e.g., soybeans) having a mixture of sizes. For example, the mixture of sizes can result from natural variation in a single crop or variety of the vegetable or from combining vegetable from several crops or varieties. The present method need not include sorting the millable vegetable by size before dehulling. That is, the present method can include dehulling millable vegetable (e.g., soybeans) of mixed or all naturally occurring sizes. For example, the present method can include dehulling beans with sizes greater than or equal to 9/64 inch, greater than 13/64 inch, greater than 15/64 inch, from 9/64 inch to greater than or equal to 20/64 inch, or that include variation in relative size from 60% of the mean to greater than or equal to 140% of the mean. For example, the present method can include dehulling beans with sizes ranging from 10 to 20 $64^{th}$ of an inch. As used herein, the phrase "dehulling a millable vegetable (e.g., soybeans) having a mixture of sizes" refers to a process excluding sorting the millable vegetable by size before dehulling.

In an embodiment, the present method includes gently drying the millable vegetable and dehulling the gently dried millable vegetable. Gentle drying can include, for example, exposing millable vegetable to a temperature of about 20 to about 120° C., about 20 to about 70° C., about 40 to about 60° C., or about 50° C. Gentle drying can take place for about 0.25 to about 20 hours, about 1 to about 6 hours, about 2 to about 3 hours, or for about 2 hours. Gentle drying can employ a suitable conventional drying apparatus. Gentle drying can include, for example, exposing soybeans to a temperature of about 50° C. for about 6 hours in a suitable drying apparatus, such as a fluid bed dryer. In an embodiment, gentle drying can include drying a millable vegetable (e.g., soybeans) from about 8 to about 20 wt-% moisture to a moisture content of about 6 to about 10 wt-% (e.g., about 6 to about 8.5 wt-%). Gentle drying can advantageously be conducted at a temperature and for a time that maintains a desirable proportion of functionality of the vegetable protein. Gentle drying to a moisture content less than or equal to about 13 wt-% can provide advantageous stability against spoilage of the millable vegetable by microorganisms.

Dehulling can require temperatures elevated above room or ambient temperature. In contrast, the present method can include dehulling at room or ambient temperature. That is, the present method can include dehulling without heating.

In an embodiment, the present method can include screening the dehulled millable vegetable. During dehulling some germ can separate from the nib or remainder of the millable vegetable. Screening can recover the germ for subsequent processing in the present method and remove dust from the millable vegetable.

Steaming Millable Vegetables

In an embodiment, the present method includes an inventive process of steaming the millable vegetable, e.g., the dehulled millable vegetable. Steaming can be conducted at predetermined temperature and/or for predetermined time. As used herein, steaming a millable vegetable at predetermined temperature and/or for predetermined time refers to the amount of time for which the millable vegetable is exposed to steam at a particular temperature. The millable vegetable need not achieve the predetermined temperature.

In an embodiment, steaming at a predetermined temperature for a predetermined time can be effective to significantly reduce the "beany" flavor (also referred to as green flavor or sulfur flavor) associated with legumes such as beans and peas. In an embodiment, such steam treatment can effectively remove the beany flavor.

In an embodiment, steam treating significantly reduces lipoxygenase activity. For example, in certain embodiments, steam treating can reduce lipoxygenase activity to less than or equal to about 75%, less than or equal to about 50%, or less than or equal to about 1% of the level found before steam treating. Although not limiting to the present invention, it is believed that reducing lipoxygenase activity reduces bad flavors from oxidized lipids and/or methanethiol. Although not limiting to the present invention, it is believed that reducing lipoxygenase activity increases shelf life. For example, a vegetable powder with only about 1% of remaining lipoxygenase activity can have a shelf life of about 1 year.

In an embodiment, steam treating significantly reduces trypsin inhibitor activity. For example, in certain embodiments, steam treating can reduce trypsin inhibitor activity to less than or equal to about 50%, less than or equal to about 35%, or less than or equal to about 3% of the level found before steam treating. For example, in certain embodiments, steam treating can reduce trypsin inhibitor activity to less than about 50,000 TIU/g, less than about 40,000 TIU/g, less than about 25,000 TIU/g, or less than about 20,000 TIU/g. Although not limiting to the present invention, it is believed that reducing trypsin inhibitor activity improves the nutritional value of the vegetable powder and products including it.

In an embodiment, steam treating maintains significant levels of protein dispersibility. For example, in certain embodiments, steam treating can maintain levels of protein dispersibility about 85% or more, about 70% or more, or about 50% or more of the level found before steam treating. Protein dispersibility is reported as a percentage, and the levels referred to in this paragraph refer to comparison of the percent protein dispersibility with and without steam treating. Although not limiting to the present invention, it is believed that maintaining significant levels of protein dispersibility improves the functional value of the vegetable powder and products including it. For example, increased protein dispersibility can lead to advantageous protein gellation in products made from the vegetable powder.

In certain embodiments, the present method includes steaming the dehulled millable vegetable at a temperature of about 95° C. to about 130° C., about 100 to about 125° C., about 105 to about 120° C., about 105 to about 115° C., or about 105 to about 110° C. In certain embodiments, the present method includes steaming the dehulled millable vegetable at a temperature less than 130° C. but greater than 95° C., greater than about 100° C., greater than about 105° C., or greater than about 115° C. In certain embodiments, the present method includes steaming the dehulled millable vegetable at a temperature greater than 95° C. but less than about 130° C., less than about 120° C., less than about 115° C., or less than about 110° C.

In certain embodiments, the present method includes steaming the dehulled millable vegetable at a temperature of 93° C. to 97° C., of 94° C. to 96° C., or of 95° C. In certain embodiments, the present method includes steaming the dehulled millable vegetable at a temperature of 103° C. to 107° C., of 104° C. to 106° C., or of 105° C. In certain embodiments, the present method includes steaming the dehulled millable vegetable at a temperature of 105° C. to 109° C., of 106° C. to 108° C., or of 107° C. In certain embodiments, the present includes steaming the dehulled millable vegetable at a temperature of 113° C. to 117° C., of 114° C. to 116° C., or of 115° C. In certain embodiments, the present method includes steaming the dehulled millable vegetable at a temperature of 118° C. to 121° C., of 119° C. to 121° C., or of 120° C. In certain embodiments, the present method includes steaming the dehulled millable vegetable at a temperature of about 95° C., about 105° C. (e.g., 107° C.), about 115° C., or about 120° C. In certain embodiments, the present method includes steaming the dehulled millable vegetable at a temperature of 95° C., 105° C., 107° C., 115° C., or 120° C.

In certain embodiments, the present method includes steaming the dehulled millable vegetable for a time of about 3 to about 12 min or about 4 to about 8 min. In certain embodiments, the present method includes steaming the dehulled millable vegetable for less than or equal to about 12 min but for at least about 3 min, at least about 4 min, or at least about 8 min. In certain embodiments, the present method includes steaming the dehulled millable vegetable for a time of at least about 3 min but less than or equal to about 12 min, less than or equal to about 8 min, or less than or equal to about 4 min. In certain embodiments, the present method includes steaming the dehulled millable vegetable for a time of about 3 min, about 4 min, about 8 min, or about 12 min. In certain embodiments, the present method includes steaming the dehulled millable vegetable for a time of 3 min, 4 min, 8 min, or 12 min.

In certain embodiments, the present method includes steaming the dehulled millable vegetable at a temperature of about 95° C. to about 130° C. for a time of about 3 to about 12 min or about 4 to about 8 min. In certain embodiments, the present method includes steaming the dehulled millable vegetable at a temperature of about 100 to about 125° C. for a time of about 3 to about 12 min or about 4 to about 8 min. In certain embodiments, the present method includes steaming the dehulled millable vegetable at a temperature of about 105 to about 120° C. for a time of about 3 to about 12 min or about 4 to about 8 min. In certain embodiments, the present method includes steaming the dehulled millable vegetable at a temperature of about 105 to about 115° C. for a time of about 3 to about 12 min or about 4 to about 8 min. In certain embodiments, the present method includes steaming the dehulled millable vegetable at a temperature of about 105 to about 110° C. for a time of about 3 to about 12 min or about 4 to about 8 min.

For example, steaming soybeans at about 95° C. for about 4 min can yield a soy powder with protein dispersibility index (PDI) of about 85% (e.g., maintain about 95% of protein dispersibility) and reduce lipoxygenase activity to about 50% of its level in unsteamed beans. This soy powder produces a soy milk with a flavor rank of 5, which can be considered adequate flavor.

For example, steaming soybeans at about 105 (e.g., 107)° C. for about 4 min can yield a soy powder with protein dispersibility index (PDI) of about 60–75% (e.g., maintain about 65 to about 80% of protein dispersibility), reduce lipoxygenase activity to about 1% its level in unsteamed beans, and reduce trypsin inhibitor activity by about 50%. This soy powder can be stable for about 1 year and can produce a soy milk with a flavor rank of 8.5, which can be considered very pleasing flavor.

For example, steaming soybeans at about 115° C. for about 4 min can yield a soy powder with protein dispersibility index (PDI) of about 40–50% (e.g., maintain about 45 to about 55% of protein dispersibility), reduce lipoxygenase activity to less than about 1% its level in unsteamed beans, and reduce trypsin inhibitor activity to less than about 20,000 TIU/g. This soy powder can be stable for more than about 1 year. This soy powder can produce a soy milk with a slight cooked note to the flavor, which can be considered a mild negative. Such soy powder can be, however, useful and well accepted in baked products.

After steaming, the steamed vegetable can be cooled and/or dried before further processing. Cooling the steamed millable vegetable can reduce the temperature of the millable vegetable to about 10° C. to about 40° C. Cooling can include retaining the steamed millable vegetable in a cooling device, such as a cooling table, for about 3 to about 12 min. Steaming can increase the moisture content of the millable vegetable beyond levels advantageous for milling. Drying can reduce the moisture content to a level acceptable for milling. For example, steaming can increase the moisture of soybean nibs to 11 or 12%. The nibs or grits can be dried to about 6% moisture in preparation for milling. The present method can also employ other or additional procedures for preparing the steamed vegetable for further processing.

Milling and Air Classifying the Vegetables

In an embodiment, the present method includes an inventive process of milling the millable vegetable, e.g., milling the dehulled and/or steamed vegetable. Milling vegetables can include grinding the vegetable into a uniformly sized powder using a machine that rubs grains of the vegetable together under pressure. In an embodiment, the present milling method includes contacting the vegetable with air from a cooling apparatus during milling, contacting the vegetable with air from a drying apparatus during milling, classifying the vegetable during milling, contacting the vegetable with air from a cooling apparatus during classifying, contacting the vegetable with air from a drying apparatus during classifying, or a combination thereof.

In an embodiment, the present method employs milling with cool and/or dried air. For example, the present method can include passing air through a cooling apparatus and conveying the air from the cooling apparatus through the milling apparatus. For example, the present method can include passing air through a drying apparatus and conveying the air from the drying apparatus through the milling apparatus. For example, the present method can include passing air through a cooling apparatus, passing air through a drying apparatus, and conveying the air from the cooling and drying apparatus through the milling apparatus. Air from the cooling and/or drying apparatus can pass through the mill and then to the classifying apparatus. In an embodiment, upon leaving the mill, the milled vegetable can be contacted with air that has been cooled and/or dried.

The present method can include cooling the air used for milling and/or classifying. The present method can include passing air through a cooling apparatus and conveying the air from the cooling apparatus through the milling and/or classifying apparatus. The air can be cooled to a temperature effective to prevent or reduce the level of burnt notes (flavor) in the vegetable powder. This can provide vegetable powder with an advantageously neutral flavor. In certain embodiments, the air can be at a temperature of about 10 to about 70° F., about 10 to about 50° F., about 10 to about 45 (e.g., 43)° F., about 20 to about 60° F., or about 20 to about 45° F. Very cold winter (e.g., about 10° F.) air may be cool enough to be used at its natural temperature for milling and/or air classifying. Nonetheless, the present method can include passing even very cold winter air through the cooling apparatus.

The present method can include drying the air used for milling and/or classifying. The present method can include passing air through a drying apparatus and conveying the air from the drying apparatus through the milling and/or classifying apparatus. Passing air through a drying apparatus can include contacting the air with drying agent or desiccant. The air can be dried to an extent effective to avoid or reduce unacceptable sticking or clumping of the vegetable powder. In certain embodiments, after passing through the drying apparatus, the air can be at a water content of about 10 to about 50 gr/lb.

The present method can include classifying the milled vegetable or vegetable powder during milling. For example, the method can include obtaining milled vegetable from the mill during milling, classifying the obtained milled vegetable, expelling fully milled vegetable powder from the mill and classifier, and returning insufficiently milled vegetable to the mill. The powder expelled from the mill and classifier can be, for example, further processed, packaged for sale, converted to other food products, stored, or a combination thereof. The powder expelled from the mill and classifier can include powder below a predetermined particle size. For example, the classifier can be configured to expel particles of which 80% have a size less than about 20 μm, less than about 15 μm, or less than about 10 μm. The insufficiently milled vegetable returned to the mill can be subjected to additional milling.

In an embodiment, the present method includes air classifying the milled vegetable or vegetable powder during milling. Air classifying includes using air to separate the smaller particles of milled vegetable from the larger particles. For example, the method can include obtaining milled vegetable from the mill during milling, air classifying the obtained milled vegetable, expelling fully milled vegetable powder from the mill and air classifier, and returning insufficiently milled vegetable to the mill. In an embodiment, the present method employs air classifying with cool and/or dried air. For example, the present method can include passing air through a cooling apparatus and conveying the air from the cooling apparatus through the air classifying apparatus. For example, the present method can include passing air through a drying apparatus and conveying the air from the drying apparatus through the air classifying apparatus. For example, the present method can include passing air through a cooling apparatus, passing air through a drying apparatus, and conveying the air from the cooling and drying apparatus through the air classifying apparatus. Air from the cooling and/or drying apparatus can pass through the mill before entering the air classifier. Air entering the classifier can include air that has passed through the mill and air conveyed from the cooling and/or drying apparatus without first passing through the mill.

The present method can include maintaining the vegetable powder at a temperature of about 10 to about 45 (e.g. 43)° C., about 20 (e.g., 21) to about 45 (e.g. 43)° C., about 20 to about 40 (e.g., 38)° C., or about 20 to about 30° C. during milling. The present method can include maintaining the vegetable powder at a water content of about 3 to about 13 wt-%, about 4 to about 10 wt-%, or about 5 to about 7 wt-% during milling.

The present method of milling and classifying can produce vegetable powders with one or more of several advantageous characteristics. In certain embodiments, the present milling and classifying produce a vegetable powder including particles 80% of which have size less than about 20 µm, less than about 15 µm, or less than about 10 µm. In an embodiment, the present milling and classifying produce vegetable powder with an advantageously neutral flavor. In an embodiment, the present milling and classifying produce vegetable powder with advantageously enhanced nutritional value. Although not limiting to the present invention, it is believed that the present milling and air classifying conditions keep the vegetable material and powder at a sufficiently low temperature to avoid burnt flavors or unacceptable levels protein denaturation.

Any of a variety of known apparatus can be employed to mill the vegetable material and reduce its particle size. Suitable known apparatus includes, for example, jet mill, pin mill, hammer mill, ball mill, roller mill, impact mill, or vibrational energy mill. In an embodiment, the present method employs milling with an air-swept pin mill. The pin mill can be in a configuration of a stator with three concentric rings and a rotor with five pins on the inner ring and 10 pins on each sequential outer ring. Millable vegetable can be fed to the inner ring and air can push the material through the several rings. The air can cool the vegetable material. The air can push the smaller vegetable material through the rings more quickly than the larger material. In such a configuration of a pin mill, the outer rings hit the vegetable material at higher impact speed than the inner rings.

Any of a variety of known apparatus can be employed for classifying the milled vegetable. In an embodiment, the present method employs an air classifier. The air classifier can be in a configuration including a bottom feed of material. The material can take a path straight up through the bottom cone of the classifier and into the bottom of the rotor. Smaller material can be swept to, for example, a cyclone. Larger material can be returned to the mill. The speed of the rotor and air sweep can be varied to determine the particle size recovered from the mill. The air classifier can be configured to sweep away particles of which 80% have a size less than about 20 µm, less than about 15 µm, or less than about 10 µm.

The milled and classified vegetable powder can be collected with any of a variety of conventional apparatus such as, for example, a cyclone. For the present method, cycloning can be conducted using a standard high efficiency cyclone. The vegetable powder can then be prepared for distribution and/or sale, for example, by storage, packaging, and shipping.

System for Milling Vegetables

The present invention also relates to an inventive system for milling vegetables. The system can produce the present vegetable powder and can be used for the present method. The present system can include an inventive configuration of steaming apparatus, milling apparatus, classifying apparatus, air cooling apparatus, and air drying apparatus. The present system can operate on any of a variety of millable vegetables.

The present system can include steaming apparatus, milling apparatus, and classifying apparatus together with vegetable handling apparatus configured to transport the vegetable from the steaming apparatus to the milling apparatus and from the milling apparatus to the classifying apparatus. The present system can also include air cooling apparatus and air drying apparatus together with air handling apparatus configured to transport the air from the cooling apparatus and drying apparatus to the milling apparatus, to the vegetable handling apparatus between the milling apparatus and the classifying apparatus, and/or to the classifying apparatus.

The present system includes a steaming apparatus. The steaming apparatus can be configured to receive millable vegetable, for example, directly or indirectly from dehulling apparatus, drying apparatus (e.g., first drying apparatus), or screening apparatus. The steaming apparatus can be configured to steam the millable vegetable at predetermined temperature and/or for predetermined time. As used herein, steaming a millable vegetable at predetermined temperature and/or for predetermined time refers to the amount of time for which the millable vegetable is exposed to steam at a particular temperature. The millable vegetable need not achieve the predetermined temperature. Exposing the millable vegetable to steam can include contacting with steam in a chamber.

In certain embodiments, the steaming apparatus can be configured to expose the millable vegetable to steam at a temperature of about 95° C. to about 130° C., about 100 to about 125° C., about 105 to about 120° C., about 105 to about 115° C., or about 105 to about 110° C. In certain embodiments, the steaming apparatus can be configured to expose the millable vegetable to steam for about 3 to about 12 min or about 4 to about 8 min.

The present system includes milling apparatus. The milling apparatus can be configured to receive millable vegetable, for example, directly or indirectly from the steaming apparatus, a vegetable cooling apparatus, or a drying apparatus (e.g., second drying apparatus). The milling apparatus can be configured to maintain the vegetable powder at a temperature of about 10 to about 45 (e.g. 43)° C., about 20 (e.g., 21) to about 45 (e.g. 43)° C., about 20 to about 40 (e.g., 38)° C., or about 20 to about 30° C. during milling. The milling apparatus can be configured to maintain the vegetable powder at a water content of about 3 to about 13 wt-%, about 4 to about 10 wt-%, or about 5 to about 7 wt-% during milling. The milling apparatus can be configured to produce a vegetable powder including particles 80% of which have size less than about 20 µm, less than about 15 µm, or less than about 10 µm.

The present system can include any of a variety of known milling apparatus. Suitable known apparatus includes, for example, jet mill, pin mill, hammer mill, ball mill, roller mill, impact mill, or vibrational energy mill. In an embodiment, the present system can include an air-swept pin mill. The pin mill can be in a configuration of a stator with three concentric rings and a rotor with five pins on the inner ring and 10 pins on each sequential outer ring.

The present system includes classifying apparatus. The classifying apparatus can be configured to receive milled vegetable, for example, directly or indirectly from the milling apparatus. The classifying apparatus can be configured to sweep away particles of which 80% have a size less than about 20 µm, less than about 15 µm, or less than about 10 µm. The classifying apparatus can be configured to return larger particles to the milling apparatus. The present system can include any of a variety of known classifying apparatus, such as an air classifier. In an embodiment, the classifying apparatus can be an air classifier. The air classifier can be in a configuration including a bottom feed of material.

The present system includes air cooling apparatus. The air cooling apparatus can be configured to receive air from the surrounding of the system or structure containing the system, e.g., the outdoors. The air cooling apparatus can reduce the temperature of air. The air cooling apparatus can pass through air that is already sufficiently cool. In certain embodiments, the air cooling apparatus can put out air at a temperature of about 10 to about 70° F., about 10 to about 50° F., about 10 to about 45 (e.g., 43)° F., about 20 to about 60° F., or about 20 to about 45° F. Very cold winter (e.g., about 10° F.) air can be passed through the air cooling apparatus without significant or any further cooling. The present system can include any of a variety of air cooling apparatus. Suitable air cooling apparatus include McQuay Air-Cooled Screw Compressor chiller.

The present system includes air drying apparatus. The air cooling apparatus can be configured to receive air from the air cooling apparatus or from the surroundings of the system or structure containing the system, e.g., the outdoors. The air drying apparatus can reduce the moisture content of air. In an embodiment, the air drying apparatus can put out air at a moisture content of about 10 to about 50 gr/lb. The present system can include any of a variety of air drying apparatus. The air drying apparatus can include a chamber in which air and drying agent or desiccant are contacted, e.g., by passing air through the desiccant or drying agent. Suitable air drying apparatus can include Des Champs Laboratories Wringer dehumidification systems.

The present system includes air handling apparatus. The air handling apparatus can be configured to take the air from the air cooling apparatus and/or the air drying apparatus to other portions of, or apparatus in, the system. For example, the air handling apparatus can be configured to transport air from the cooling apparatus and drying apparatus to the milling apparatus, to the vegetable handling apparatus between the milling apparatus and the classifying apparatus, and/or to the classifying apparatus.

In an embodiment, the air handling apparatus can direct air from the air cooling apparatus and/or air drying apparatus into and/or through the milling apparatus. In an embodiment, the air handling apparatus can direct air from the air cooling apparatus and/or air drying apparatus into and/or through the classifying apparatus. In an embodiment, the air handling apparatus can direct the air into and/or through the mill and then to the classifying apparatus. In an embodiment, the air handling apparatus can direct air to a point at or just beyond the exit from the mill, e.g., into the vegetable handing apparatus just beyond the exit from the mill.

The present system can include any of a variety of air handling apparatus. The air handling apparatus can include ducts, dampers, fans, blowers, butterfly valves, slide gates, venturi valves, and the like in any of a variety of conventional configurations. Suitable air handling apparatus include a MAC. bag house with Twin City fans and blowers.

The present system includes vegetable handling apparatus. The vegetable handling apparatus can be configured to transport vegetable into, between components of, and out of the system. For example, the vegetable handling apparatus can be configured to transport the vegetable into the steaming apparatus, from the steaming apparatus to the milling apparatus, from the milling apparatus to the classifying apparatus, out of the classifying apparatus, a combination thereof, or the like. The present system can include any of a variety of vegetable handling apparatus. The vegetable handling apparatus can include chutes, augers, ducts, blowers, aeromechanical conveyor belts, elevators, pipes and tubes, and the like in any of a variety of conventional configurations. Suitable vegetable handling apparatus include MHS bucket elevators, Cablevey aeromechanical conveyors.

In certain embodiments, the present system can also include one or more of vegetable transport apparatus, vegetable storage apparatus, vegetable grading apparatus, vegetable sorting apparatus, vegetable washing apparatus, vegetable drying apparatus, vegetable cleaning apparatus, vegetable cold expressing apparatus, or other conventional apparatus that can prepare a millable vegetable for further processing.

In an embodiment, the present system can also include a first drying apparatus configured to receive millable vegetable and to gently dry it. The first drying apparatus can be configured to expose millable vegetable to a temperature of about 20 to about 120° C., about 20 to about 70° C., about 40 to about 60° C., or about 50° C. The first drying apparatus can be configured to retain the millable vegetable for about 0.25 to about 20 hours, about 1 to about 6 hours, about 2 to about 3 hours, or for about 2 hours. The first drying apparatus can be any of a variety of known drying devices, such as a fluid bed dryer. In an embodiment, the first drying apparatus can be a fluid bed dryer.

In an embodiment, the present system includes dehulling apparatus. In an embodiment, the dehulling apparatus can be configured to receive millable vegetable from the first drying apparatus. The dehulling apparatus can be configured to dehull at room or ambient temperature. The dehulling apparatus can be any of a variety of known dehulling devices, such as a cracking mill. In an embodiment, the dehulling apparatus can be a cracking mill.

In an embodiment, the present system can also include a screening apparatus that can be configured to receive vegetable from the dehulling apparatus. The screening apparatus can be configured to separate dust from the germ and the grit or nib of the millable vegetable. The dust can be disposed of. The germ and grit or nib can be milled. The screening apparatus can be any of a variety of known screening devices suitable for millable vegetables, such as a Kason circular vibration screener, Tokuju vibrating screen, Midwestern Industries Gyra-Vibe separator. In an embodiment, the screening apparatus is configured to receive millable vegetable from the dehulling apparatus.

The present system includes steaming apparatus. In certain embodiments, the steaming apparatus can be configured to receive millable vegetable from the dehulling apparatus or the screening apparatus. Suitable steaming apparatus are described hereinabove.

In an embodiment, the present system can also include a vegetable cooling apparatus configured to receive steamed millable vegetable and to reduce its temperature. The vegetable cooling apparatus can be configured to receive steamed millable vegetable from the steaming apparatus. The vegetable cooling apparatus can be any of a variety of known cooling devices, such as a cooling table. In an embodiment, the vegetable cooling apparatus can be a cooling table.

In an embodiment, the present system can also include a second drying apparatus configured to receive steamed millable vegetable and to reduce its moisture content. The second drying apparatus can be configured to receive steamed millable vegetable from the steaming apparatus or the cooling apparatus. In an embodiment, the second drying apparatus can be configured to receive steamed and cooled millable vegetable from the cooling apparatus. The second drying apparatus can be configured to reduce the moisture content of the millable vegetable to a level acceptable for milling. For example, the second drying apparatus can decrease the moisture of the steamed millable vegetable (e.g., soybeans) nibs from about 11 or 12% to about 6% moisture in preparation for milling. The second drying apparatus can be any of a variety of known drying devices, such as a fluid bed dryer. In an embodiment, the second drying apparatus can be a fluid bed dryer.

In an embodiment, the present system can also include an aspirating system configured to remove fine and/or light material (e.g., hull) from the millable vegetable. For example, the aspirating system can remove hulls and material that can interfere with milling the millable vegetable. The aspirating system can be configured to receive millable vegetable from the second drying apparatus. The aspirating system can be an air aspirator configured to remove hulls and other light material that separates from the millable vegetable during drying. The aspirator can be configured in multiple (e.g., 4) stages. The aspirating system can be an air aspirator such as a 4 stage Kice multiaspirator.

The present system includes milling apparatus. In certain embodiments, the milling apparatus can be configured to receive millable vegetable from the steaming apparatus, the vegetable cooling apparatus, or the second drying apparatus. Suitable milling apparatus are described hereinabove.

The present system includes classifying apparatus. In an embodiment, the classifying apparatus can be configured to receive milled vegetable from the milling apparatus. Suitable classifying apparatus are described hereinabove.

In an embodiment, the present system can include any of a variety of vegetable powder collection apparatus. For example, the present system can include a cyclone, such as a standard high efficiency cyclone. The cyclone can be configured to receive vegetable powder of a desired size from the classifying apparatus. The present system can also include additional vegetable powder processing apparatus, packaging apparatus, storage systems, a combination thereof, or the like.

The present system includes air handling apparatus. Suitable air handling apparatus are described hereinabove. In certain embodiments, the air handling apparatus can be configured to direct air from the air cooling and/or air drying apparatus into or through one or more of the dehulling apparatus, first drying apparatus, screening apparatus, vegetable cooling apparatus, second drying apparatus, vegetable powder collection apparatus, or the like.

The present system includes vegetable handling apparatus. Suitable vegetable handling apparatus are described hereinabove. In certain embodiments, the vegetable handling apparatus can be configured to transport vegetable material into, through, out of, or between one or more of the vegetable transport apparatus, vegetable storage apparatus, vegetable grading apparatus, vegetable sorting apparatus, vegetable washing apparatus, vegetable drying apparatus, vegetable cleaning apparatus, vegetable cold expressing apparatus, dehulling apparatus, first drying apparatus, screening apparatus, vegetable cooling apparatus, second drying apparatus, vegetable powder collection apparatus, packaging apparatus, storage system, or the like.

Illustrated Embodiments of the System

Figure 2:
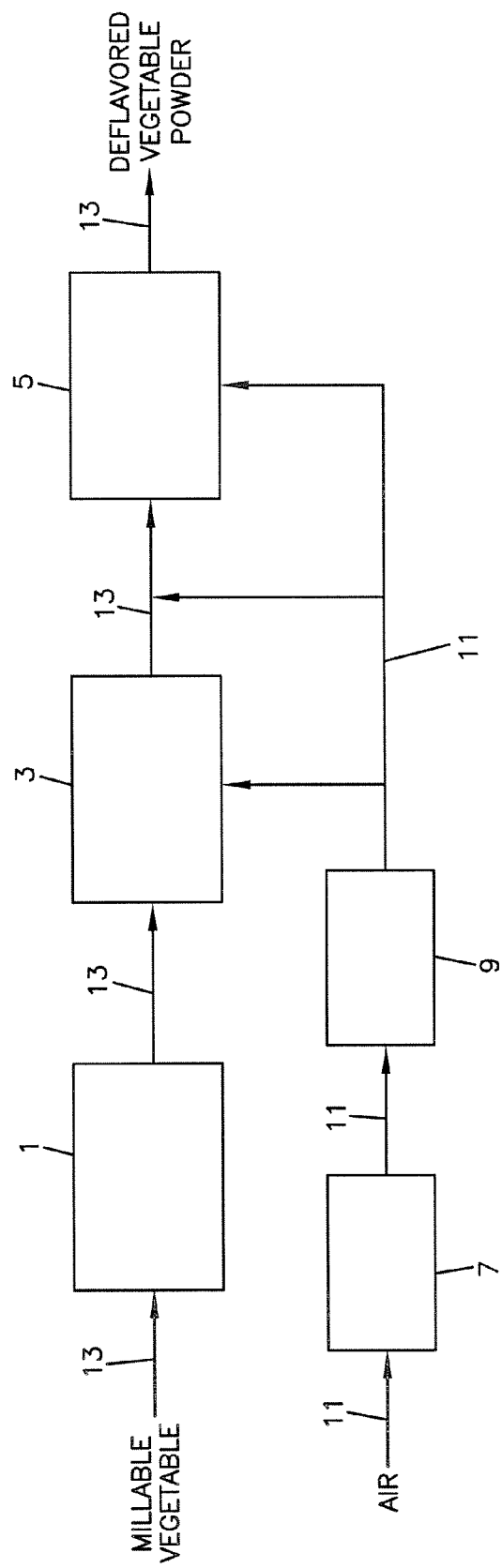
FIG. 2 schematically illustrates an embodiment of a system for carrying out steaming, milling, and/or classifying according to an embodiment of the present invention.

FIG. 2 illustrates an embodiment of the present inventive system for milling vegetables. As shown in FIG. 2, the illustrated embodiment, includes steamer 1, mill 3, classifier 5, cooler 7, and dryer 9. Air system 11 can be configured to convey air into cooler 7, from cooler 7 to dryer 9, and/or from dryer 9 to mill 3, to vegetable transport system 13, and/or to classifier 5. Vegetable transport system 13 can be configured to convey vegetable material into steamer 1, directly or indirectly from steamer 1 to mill 3, directly or indirectly from mill 3 to classifier 5, and/or from classifier 13.

Steamer 1 can be any of a variety of steam chambers suitable for steaming millable vegetables. For example, steamer 1 can include a sealed tank in which millable vegetable is contacted with steam from a source of steam. Millable vegetable can be transported through the steamer by a belt. Steamer 1 can be configured to contact the millable vegetable with steam of a predetermined temperature for a predetermined time. Steamer 1 can be configured to contact millable vegetable with steam at a temperature of about 95° C. to about 130° C., about 100 to about 125° C., about 105 to about 120° C., about 105 to about 115°C., or about 105 to about 110° C. In certain embodiments, steamer 1 can be configured to contact millable vegetable with steam for about 3 to about 12 min or about 4 to about 8 min.

Mill 3 can be any of a variety of mills suitable for milling millable vegetable. For example, mill 3 can be a jet mill, pin mill, hammer mill, ball mill, roller mill, impact mill, or vibrational energy mill. In an embodiment, the mill 3 is an air-swept pin mill. Mill 3 can be in a configuration of a stator with three concentric rings and a rotor with five pins on the inner ring and 10 pins on each sequential outer ring. In an embodiment, air transport system 11 is configured to convey air into mill 3, e.g., into the center of an air-swept pin mill.

Classifier 5 can be any of a variety of classifiers suitable for classifying milled vegetables or other particulate matter. For example, classifier 5 can be an air classifier. Classifier 5 can be configured to sweep away particles of which 80% have a size less than about 20 µm, less than about 15 µm, or less than about 10 µm. Classifier 5 can be configured to return larger particles to the milling apparatus.

Cooler 7 can be any of a variety of systems suitable for cooling air for industrial or food processing uses. For example, cooler 7 can be an air cooled screw compressor chiller. Cooler 7 can be configured to produce air at a temperature of about 10 to about 70° F., about 10 to about 50° F., about 10 to about 45 (e.g., 43)° F., about 20 to about 60° F., or about 20 to about 45° F.

Dryer 9 can include any of a variety of systems suitable for drying air for industrial or food processing uses. For example, dryer 9 can include can include a chamber in which air and drying agent or desiccant are contacted, e.g., by passing air through the desiccant or drying agent in apparatus such as a Des Champs Wringer dehumidification system with a wound silica gel desiccant wheel. Dryer 9 can be configured to produce air at a moisture content of about 10 to about 50 gr/lb.

Air system 11 can be any of a variety of systems suitable for handling and transporting air for industrial or food processing uses. For example, air system 11 can be a configuration of ducts, dampers, fans, blowers, butterfly valves, slide gates, or venturi valves suitable for transporting and handling air into, out of, or between cooler 7, dryer 9, steamer 1, mill 3, or classifier 5. Air system 11 can be configured to transport air from the cooler 7 and dryer 9 to the mill 3, to vegetable transport system 13 between mill 3 and classifier 5, and/or to classifier 9. In an embodiment, air system 11 can direct air from cooler 7 and/or dryer 9 into and/or through mill 3. In an embodiment, air system 11 can direct air from cooler 7 and/or dryer 9 into and/or through classifier 5. In an embodiment, air system 11 can direct the air into and/or through mill 3 and then to classifier 5. In an embodiment, air system 11 can direct the air to a point at or just beyond the exit from mill 3, e.g., vegetable transport system 13 just beyond the exit from mill 3.

Vegetable transport system 13 can be any of a variety of systems suitable for handling and transporting vegetable material for industrial or food processing purposes. For example, vegetable transport system 13 can be a configuration of chutes, augers, conveyors, elevators, ducts, blowers, suitable for transporting vegetable material (e.g., millable vegetable or vegetable powder) directly or indirectly into, between, or out of steamer 1, mill 3, or classifier 5.

Figure 3:
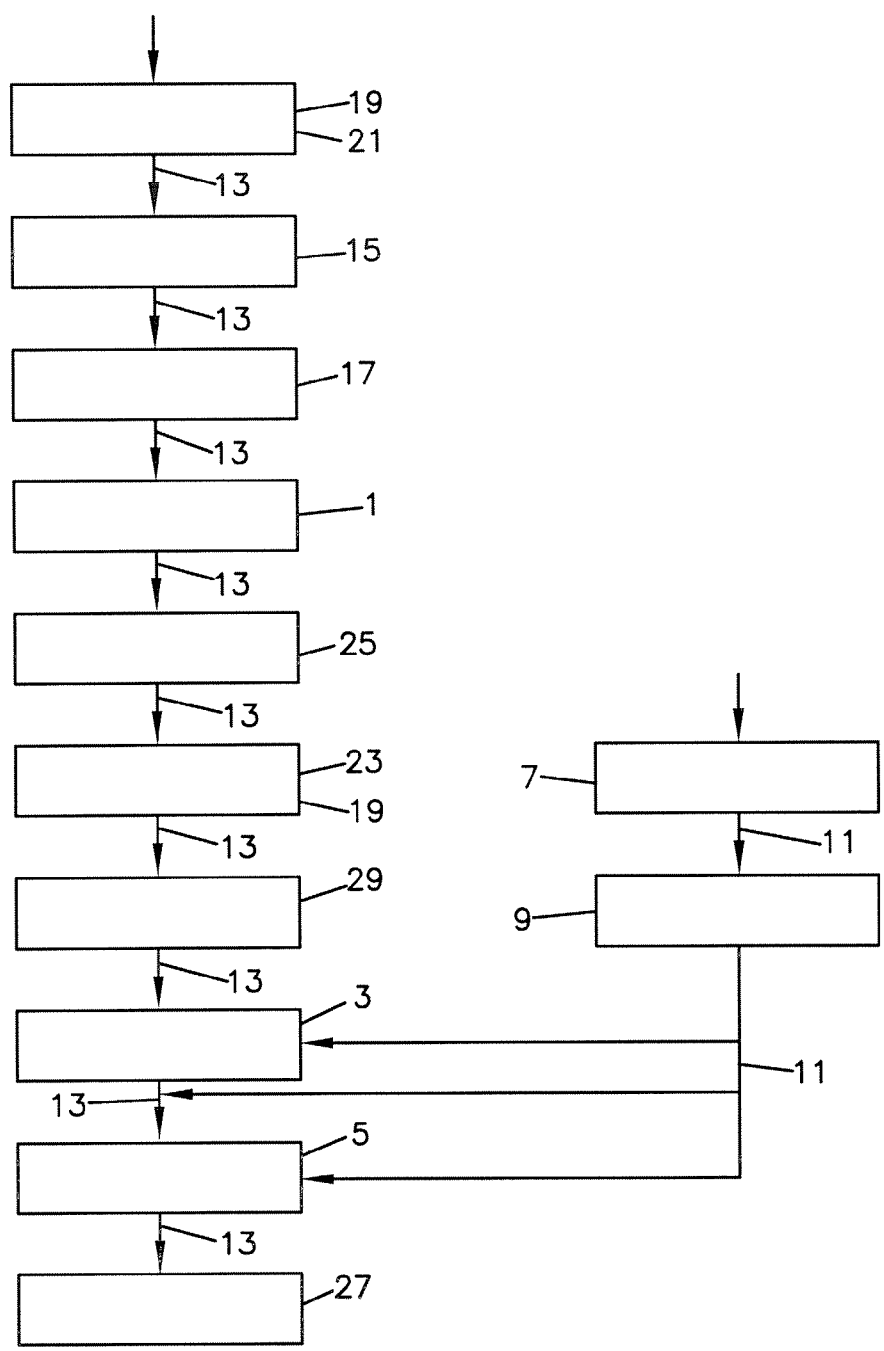
FIG. 3 schematically illustrates a second embodiment of a system for carrying out steaming, milling, and/or classifying according to an embodiment of the present invention.

FIG. 3 illustrates another embodiment of the present inventive system for milling vegetables. As shown in FIG. 3, the illustrated embodiment, includes steamer 1, mill 3, classifier 5, cooler 7, dryer 9, air system 11, vegetable transport system 13, vegetable dryer 19 (e.g., first vegetable dryer 21 and second vegetable dryer 23), dehuller 15, screen 17, vegetable cooler 25, aspirator 29, and cyclone 27. In this embodiment, steamer 1, mill 3, classifier 5, cooler 7, dryer 9, air system 11, and vegetable transport system 13 can be as described with reference to FIG. 2.

In this embodiment, air system 11 can be configured as described with respect to the embodiment of FIG. 2 and, optionally, to direct air from the cooler 7 and/or dryer 9 into or through one or more of the first vegetable dryer 21, dehuller 15, screen 17, vegetable cooler 25, second vegetable dryer 23, aspirator 29, cyclone 27, or the like.

In this embodiment, the vegetable transport system 13 can be configured to transport vegetable material into, through, out of, or between one or more of the first vegetable dryer 21, dehuller 15, screen 17, vegetable cooler 25, second vegetable dryer 23, aspirator 29, cyclone 27, or the like. For example, vegetable transport system 13 can be configured to transport vegetable material directly or indirectly from first vegetable dryer 21 to dehuller 15, directly or indirectly from dehuller 15 to screen 17, directly or indirectly from screen 17 to steamer 1, directly or indirectly from steamer 1 to vegetable cooler 25, directly or indirectly from vegetable cooler 25 to second vegetable dryer 23, directly or indirectly from second vegetable dryer 23 to aspirator 29, directly or indirectly from aspirator 29 to mill 3, directly or indirectly from mill 3 to classifier 5, and/or directly or indirectly from classifier 5 to cyclone 27.

Vegetable dryer 19 can be can be any of a variety of systems suitable for drying a millable vegetable. For example, vegetable dryer 19 can be a fluid bed dryer. First vegetable dryer 21 can be configured to receive millable from, for example, vegetable storage, loading cleaning, or sorting systems. First vegetable dryer 21 can be configured to expose millable vegetable to a temperature of about 20 to about 120° C., about 20 to about 70° C., about 40 to about 60° C., or about 50° C. for about 0.25 to about 20 hours, about 1 to about 6 hours, about 2 to about 3 hours, or for about 2 hours. Second vegetable dryer 23 can be configured to receive steamed millable vegetable and to reduce its moisture content. For example, second vegetable dryer 23 can be configured to decrease the moisture of the steamed millable vegetable (e.g., soybeans) nibs from about 11 or 12% to about 6% moisture in preparation for milling.

Dehuller 15 can be any of a variety of systems suitable for dehulling a vegetable with a hull. For example, dehuller 15 can be a cracking mill. Dehuller 15 can be configured to operate at ambient temperature.

Screen 17 can be any of a variety of systems suitable for screening a millable vegetable, e.g., removing dust from larger portions of the vegetable. For example, screen 17 can be 8 to 12 mesh. Screen 17 can be a commercially available system such as a Kason circular vibration screener, Tokuju vibrating screen, Midwestern Industries Gyra-Vibe separator.

Vegetable cooler 25 can be any of a variety of systems suitable for cooling a millable vegetable. For example, vegetable cooler 25 can be a cooling table. Aspirator 29 can be any of a variety of systems suitable for removing fines and or other lightweight material from a millable vegetable. For example, aspirator 29 can be an air aspirator, such as a multistage air aspirator, such as a 4 stage Kice multiaspirator. Cyclone 27 can be any of a variety of suitable apparatus for collecting powder. For example, cyclone 27 can be a standard high efficiency cyclone.

Vegetable Powder Products

The present invention also relates to products made from or including the present vegetable powders, e.g., vegetable powders made by the present method. Such products include "milk" made from the vegetable powder. As used herein vegetable milk refers to any aqueous dispersion of the vegetable powder. Such dispersions include suspensions and homogenates. For example, a milk can be produced from a vegetable powder of a millable vegetable by mixing the powder with hot water, cooking the mixture, cooling the milk, and homogenizing the milk.

Additional vegetable powder products include smoothies, butter, cream cheese, sour cream, cheese sauce, cheese, ice cream, yogurt, frozen yogurt, pudding, gelatin, baked goods (e.g., cookies, pancakes, waffles, muffins, breads, tortillas, and the like), or ground meat products (e.g., sausage).

The present invention may be better understood with reference to the following examples. These examples are intended to be representative of specific embodiments of the invention, and are not intended as limiting the scope of the invention.

EXAMPLES

Example 1

The Present Invention Produced Advantageously Small Vegetable Powder Particles

This example demonstrated the small particle size achieved for vegetable powders processed according to the present invention.

Materials and Methods

An embodiment of the present method was employed for processing soybeans. Briefly: The soybeans were dehulled.

Lots A and B of the dehulled beans were steam treated at 105° C. for 4 min. Lot C. was not steamed. The steamed beans were dried. The dried beans were milled to a soy powder. Particle size was evaluated employing an ELZONE® Model 5382 Particle Size Analyzer.

Results

Table 1 reports the particle sizes of the soy powder obtained.

TABLE 1

Vegetable Powder Particle Size

|  | Lot A | Lot B | Lot C |
| --- | --- | --- | --- |
| Geometric Mean | 8.0 μm | 8.8 μm | 9.6 μm |
| PERCENTILES |  |  |  |
| 0.1% Volume below | 2.6 μm | 2.6 μm | 2.7 μm |
| 10% Volume below | 3.8 μm | 4.7 μm | 5.3 μm |
| 50% Volume below | 8.2 μm | 8.7 μm | 9.5 μm |
| 70% Volume below | 11.7 μm | 12.2 μm | 12.1 μm |
| 80% Volume below | 12.4 μm | 14.8 μm | 13.9 μm |
| 90% Volume below | 14.9 μm | 18.7 μm | 17.3 μm |
| 95% Volume below | 17.6 μm | 23.9 μm | 20.7 μm |
| 99% Volume below | 29.7 μm | 56.5 μm | 32.2 μm |
| 99.9% Volume below | 66.7 μm | 90.2 μm | 55.9 μm |

Conclusions

The present method produced a vegetable powder having a particle size with advantages such as a mean particle size at or below about 10 μm, with about 90% of the particles of size less than 20 μm.

Example 2

The Present Invention Produces Vegetable Powder with Advantageously Low Levels of Lipoxygenase Activity This example demonstrated the low levels of lipoxygenase activity achieved for vegetable powders processed according to the present invention.

Materials and Methods

The dehulled beans (predominantly halves and quarters) were steam treated temperatures indicated in the table reporting results for 4 min. This brought the beans to 9–16% moisture. The dried beans were milled to a soy powder.

Lipoxygenase activity was determined by a known assay method. Briefly: Steamed beans were milled in a coffee mill and homogenized in distilled water. The homogenate was allowed to settle at room temperature for 20 min. Then the supernatant was decanted and centrifuged for 20 min at 1100 ×g. One mL of this soy extract was diluted with 9 mL of water for the assay. The lipoxygenase assay was conducted in a 0.2 M phosphate buffer, pH 9.0, at 30° C. using linoleic acid as substrate and methylene blue as a reporter. Lipoxygenase activity was followed as the change in optical density at 660 nm with time at 30° C. (OD/min) using a Beckman DU-7 spectrophotometer.

Results

Table 2 reports the lipoxygenase activity in the vegetable powder obtained.

TABLE 2

Vegetable Powder Lipoxygenase Activity

| Steam Temperature (° C.) | Relative Lipoxygenase Activity (OD/min) |
| --- | --- |
| No steam heat | −0.432 |
| 80 | −0.421 |
| 85 | −0.414 |
| 90 | −0.320 |
| 95 | −0.185 |
| 100 | 0 |

Conclusions

Embodiments of the present method produced a vegetable powder having advantageously low lipoxygenase activity. For example, the method eliminated lipoxygenase activity by treatment with steam at 100° C. Significant reduction of lipoxygenase activity, which was obtained at 100° C., can significantly increase the shelf life of the vegetable powder.

Example 3

The Present Invention Produces Vegetable Powder with Advantageous Protein Dispersibility and Trypsin Inhibitor Activity This example demonstrated the advantageous levels of protein dispersibility and trypsin inhibitor activity achieved for vegetable powders processed according to the present invention.

Experiment 1

Materials and Methods

The present method was employed for processing soybeans. The dehulled beans (predominantly halves and quarters) were steam treated at the temperatures indicated in the table reporting results for 4 min. The steamed beans were dried and the dried beans were milled to a soy powder.

Protein dispersibility index was determined by a known method, AOCS Ba10-65. Briefly: The vegetable powder was blended into water to form a slurry. The slurry was centrifuged for 10 min at 2700 rpm. Protein was determined in the supernatant by the Kjeldahl method (AACC 46-16). The protein dispersibility index was calculated from the protein levels according to known equations.

Trypsin inhibitor activity was determined by a known method, AOCS Ba12-75. Briefly: The beans were ground to at least 100 mesh and defatted. The ground and defatted beans were extracted with aqueous base. This extract was diluted with buffer, trypsin was added, and the sample was incubated with substrate. Trypsin activity was measured by hydrolysis of a known substrate (BAPA), which can be followed by absorbance at 410 nm. The sample was filtered before measuring absorbance. A reduction in trypsin activity was used to quantify trypsin inhibitor activity.

Results

Table 3 reports the protein dispersibility index (PDI) and trypsin inhibitor activity (TIU/g) in the soy powder obtained.

TABLE 3

Steam Temperature and Resulting Soy Powder
Protein Dispersibility Index and Trypsin Inhibitor Activity

| Temperature (° C.) | Protein Dispersibility Index (%)[1] | Trypsin Inhibitor Activity (TIU/g)[2] |
|---|---|---|
| No heat | 91.9 | 66,378 |
| 80 | 87.4 | 69,520 |
| 85 | 94.6 | 72,118 |
| 90 | 89.5 | 81,102 |
| 95 | 86.6 | 72,137 |
| 100 | 76.4 | 46,143 |
| 105 | 61.7 | 31,065 |
| 110 | 51.0 | 20,489 |
| 115 | 40.0 | 17,749 |
| 120 | 26.5 | 8,720 |

[1]Protein Dispersibility Index, AOCS Ba10-54
[2]Trypsin Inhibitor Activity, on a dry weight basis, AOCS Ba12-75

Conclusions

The present method produced soy powder having advantageous levels of protein dispersibility and trypsin inhibitor activity. For example, treatment with steam at 105° C. maintains 60% protein dispersibility, while reducing trypsin inhibitor activity by more than 50%. For example, treatment with steam at 110° C. reduced trypsin inhibitor activity by about 70% to about 20,000 units, while retaining more than 50% protein dispersibility. For example, treatment with steam at 115° C. reduced trypsin inhibitor activity by about 75% to less than 20,000 units, while retaining more than 40% protein dispersibility. This method also causes significant reductions in trypsin inhibitor (e.g., to less than 20,000 TIU/g) activity from other beans.

Experiment 2

Materials and Methods

The present method was employed for processing samples of several vegetables. The raw vegetables (predominantly halves and quarters) were steam treated at the temperatures indicated in the table reporting results for 4 min. The dried beans were milled to a vegetable powder. Protein dispersibility index and trypsin inhibitor activity were determined by known methods as described above.

Results

Table 4 reports the protein dispersibility index (PDI) and trypsin inhibitor activity (TIU/g) in the raw vegetables, raw pea powder, and steam treated vegetable powders.

TABLE 4

Protein Dispersibility Index and Trypsin Inhibitor Activity
for Raw Vegetables and Treated Vegetable Powders

| Vegetable Sample | Protein Dispersibility Index (%)[5] | Trypsin Inhibitor Activity (TIU/g)[6] |
|---|---|---|
| Raw Yellow Peas | 73.2 | 2,900 |
| Raw Yellow Pea Powder | 79.2 | 2,200 |
| Treated Yellow Pea Powder[1] | 63.4 | <2,000 |
| Raw Pinto Beans | 83.1 | 15,300 |
| Treated Pinto Bean Powder[2] | 35.7 | <2,000 |
| Raw Black Beans | 79.3 | 17,000 |
| Treated Black Bean Powder[3] | 51.7 | <2,000 |
| Raw Soybeans | 90.3 | 53,300 |
| Treated Soybean Powder[4] | 66.6 | 27,200 |

[1]Steam Heat at 105° C. for 4 min.
[2]Steam Heat at 115° C. for 4 min.
[3]Steam Heat at 115° C. for 4 min.
[4]Steam Heat at 105° C. for 4 min.
[5]Protein Dispersibility Index, AOCS Ba10-54
[6]Trypsin Inhibitor Activity as is basis, AOCS Ba12-75

Conclusions

The present method produced vegetable powders having advantageous levels of protein dispersibility and trypsin inhibitor activity. For example, steam treatment retains more than about 70% of the protein dispersibility found in the raw vegetable. For example, treatment with steam at 105° C. reduced trypsin inhibitor activity to about only 50% of that found in the raw vegetable, and in each case to less than about 20,000 TIU/g.

Experiment 3

Experiment 3a—Soy Powder

The present method was employed for processing four thousand pounds of soybeans. The soybeans were received with a moisture content of 9.3%. They were dried at 50° C. to 6.7% moisture, cracked, and dehulled. The dehulled beans (predominantly halves and quarters) were steam treated at 115° C. for 4 min. This brought the beans to 13.3% moisture. The steamed beans were dried for approximately 4 hr at 70° C. This brought the beans to 4.4% moisture. The dried beans were milled to a soy powder with an average particle size of 10 μm.

This soy powder has a 46.6% PDI and trypsin inhibitor level of 12,800 TIU/G.

Experiment 3b—Soy Powder

The present method was employed for processing four thousand pounds of soybeans. The soybeans were received with a moisture content of 9.3%. They were dried at 50° C. to 5.8% moisture, cracked, and dehulled. The dehulled beans (predominantly halves and quarters) were steam treated at 107° C. for 4 min. This brought the beans to 12.1% moisture. The steamed beans were dried for approximately 4 hr at 70° C. This brought the beans to 5.9% moisture. The dried beans were milled to a soy powder with an average particle size of 10 μm.

This soy powder has a 66.1% PDI and trypsin inhibitor level of 20,800 TIU/G.

Experiment 3c—Black Bean Powder

The present method was employed for processing one thousand pounds of black beans. The black beans were received with a moisture content of 13.4%. They were dried at 50° C. to 10.5% moisture, cracked, and dehulled. The dehulled beans (predominantly halves and quarters) were steam treated at 115° C. for 4 min. This brought the beans to 15.3% moisture. The steamed beans were dried for approximately 3 hr at 70° C. This brought the beans to 5.2% moisture. The dried beans were milled to a black bean powder with an average particle size of 10 µm.

This black bean powder has a 51.7% PDI and trypsin inhibitor level of <2,000 TIU/G.

Experiment 3d—Black Bean Powder

The present method was employed for processing one thousand pounds of black beans. The black beans were received with a moisture content of 14.0%. The beans were steam treated at 115° C. for 8 min. This brought the beans to 20.7% moisture. The steamed beans were dried for approximately 3 hr at 70° C. This brought the beans to 6.4% moisture. The dried beans were milled to a black bean powder with an average particle size of 10 µm.

This black bean powder has a 57.6% PDI and trypsin inhibitor level of <2,000 TIU/G.

Experiment 3e—Pinto Bean Powder

The present method was employed for processing one thousand pounds of pinto beans. The pinto beans were received with a moisture content of 15.6% and dehulled. The dehulled beans were steam treated at 115° C. for 4 min. This brought the beans to 19.2% moisture. The steamed beans were dried for approximately 4 hr at 70° C. This brought the beans to 4.1% moisture. The dried beans were milled to a pinto bean powder with an average particle size of 10 µm.

This pinto bean powder has a 35.7% PDI and trypsin inhibitor level of <2,000 TIU/G.

Conclusions

The present method produced vegetable powders having advantageous levels of protein dispersibility and trypsin inhibitor activity.

Example 4

The Present Invention Produces Vegetable Powder with Advantageous Fresh and Pleasant Flavor This example demonstrated the advantageous fresh and pleasant flavor and pleasing color achieved for vegetable powders processed according to the present invention.

Materials and Methods

The present method was employed for processing soy beans. The dehulled beans were steam treated temperatures indicated in the table reporting results for about 4 min. The dried beans were milled to a vegetable powder.

The soy powders were processed to make soymilk to evaluate their organoleptic characteristics. Soy powder (70 g) was blended into 1000 mL of hot water (82° C.) for 2 min, cooked to boiling for 2 min, and then filtered to get rid of large insoluble residues. The cooked soymilk was cooled immediately to room temperature. After cooling, the soymilk was homogenized at 8000 psi to produce a smooth texture, and evaluated for color and flavor.

Flavor and color were evaluated by known methods. Briefly, the testing included organoleptic evaluation by a three member panel trained and experienced with soymilk.

Results

Table 5 reports the results of evaluation of flavor, color, and off taste achieved by employing in soymilk a vegetable powder made by the present method.

TABLE 5

Soymilk Flavor, Color and Off Flavor Improved by Steam Treatment According to the Present Invention.

| Steam Temperature (° C.) | Flavor[1] | Color[2] | Off Taste[3] |
|---|---|---|---|
| 107 | 8.5 | 9 | 1 |
| 95 | 5 | 5 | 5 |

[1] A score of 10 the best, fresh and pleasant, 1 is the lowest with green beany flavor
[2] A score of 10 is the best creamy yellow to white, 1 is the lowest pink to dark brown
[3] A score of 10 has the highest off flavor and rancidity while 1 is the lowest off flavor with no rancidity Conclusions The present method produced vegetable powders that produce milks having advantageous good flavor, good color, and lack of off flavor. For example, the present steam treatment increased the flavor rating by 3.5 points, which indicates reduction in green and beany off flavors. For example, the present steam treatment decreased the off taste rating by 4 points, which indicates elimination of rancid (e.g., soapy and painty) off-flavors.

It should be noted that, as used in this specification and the appended claims, the singular forms "a," "an," and "the" include plural referents unless the content clearly dictates otherwise. Thus, for example, reference to a composition containing "a compound" includes a mixture of two or more compounds. It should also be noted that the term "or" is generally employed in its sense including "and/or" unless the content clearly dictates otherwise.

It should also be noted that, as used in this specification and the appended claims, the phrase "adapted and configured" describes a system, apparatus, or other structure that is constructed or configured to perform a particular task or adopt a particular configuration to. The phrase "adapted and configured" can be used interchangeably with other similar phrases such as arranged and configured, constructed and arranged, adapted, constructed, manufactured and arranged, and the like.

All publications and patent applications in this specification are indicative of the level of ordinary skill in the art to which this invention pertains.

The invention has been described with reference to various specific and preferred embodiments and techniques. However, it should be understood that many variations and modifications may be made while remaining within the spirit and scope of the invention.

We claim:

1. A method of producing vegetable powder, comprising:
contacting millable vegetable with steam at about 95° C. to about 130° C. for about 3 to about 12 min;
milling the millable vegetable, milling comprising:
contacting the vegetable with air previously passed through a cooling apparatus during milling, or
contacting the vegetable during milling with air previously passed through a cooling apparatus and a drying apparatus,
wherein the air previously passed through a cooling apparatus comprises air at temperature of about 20° F. to about 60° F.;
simultaneously with milling, classifying the milled vegetable, classifying comprising:
contacting the vegetable with air previously passed through a cooling apparatus during classifying, or
contacting the vegetable during classifying with air previously passed through a cooling apparatus and a drying apparatus, wherein the air previously passed through a cooling apparatus comprises air at temperature of about 20° F. to about 60° F.; and
producing vegetable powder of which at least about 70% has a particle size less than 20 microns.

2. The method of claim 1, wherein the millable vegetable comprises a hull; and the method further comprises:
dehulling the millable vegetable, dehulling comprising:
dehulling vegetable having a mixture of sizes;
gently drying the vegetable and dehulling the gently dried vegetable; dehulling at
ambient temperature; or
a combination thereof.

3. The method of claim 1, comprising contacting millable vegetable with steam at about 105° C. to about 120° C.

4. The method of claim 1, comprising contacting millable vegetable with steam for about 4 min to about 8 min.

5. The method of claim 1, wherein the millable vegetable comprises legume, grain, or mixture thereof.

6. The method of claim 5, wherein the millable vegetable comprises legume seed, grain seed, or mixture thereof.

7. The method of claim 5, wherein the legume comprises black bean, pinto bean, red bean, broad bean, lentil, soybean, pea, or mixture thereof.

8. The method of claim 5, wherein the legume comprises whole legume, legume germ, legume cotyledon, or mixture thereof.

9. The method of claim 1, wherein the vegetable comprises soybean.

10. The method of claim 1, wherein at least about 80% of the vegetable powder has a particle size of less than about 20 µm.

11. A method of producing vegetable powder, comprising:
contacting millable vegetable with steam at about 95° C. to about 130° C. for about 3 to about 12 min;
milling the millable vegetable, milling comprising:
contacting the vegetable with air previously passed through a cooling apparatus during milling, or
contacting the vegetable during milling with air previously passed through a cooling apparatus and a drying apparatus,
wherein the air previously passed through a cooling apparatus comprises air at temperature of about 20° F. to about 60° F.; and
producing vegetable powder of which at least about 70% has a particle size less than 20 microns.

12. The method of claim 11, the method further comprising:
dehulling the millable vegetable, dehulling comprising:
dehulling vegetable having a mixture of sizes;
gently drying the vegetable and dehulling the gently dried vegetable;
dehulling at ambient temperature; or
a combination thereof; and
producing vegetable powder of which at least about 70% has a particle size less than 20 microns.

13. A method of producing vegetable powder, comprising:
milling millable vegetable, milling comprising:
contacting the vegetable with air previously passed through a cooling apparatus during milling, or
contacting the vegetable during milling with air previously passed through a cooling apparatus and a driving apparatus,
wherein the air previously passed through a cooling apparatus comprises air at temperature of about 20° F. to about 60° F.;
producing vegetable powder of which at least about 70% has a particle size less than 20 microns.

14. The method of claim 13, the method further comprising:
dehulling the millable vegetable, dehulling comprising:
dehulling vegetable having a mixture of sizes;
gently drying the vegetable and dehulling the gently dried vegetable;
dehulling at ambient temperature; or
a combination thereof; and
producing vegetable powder of which at least about 70% has a particle size less than 20 microns.

15. A method of producing vegetable powder, comprising:
milling millable vegetable;
simultaneously with milling, classifying the milled vegetable, classifying comprising:
contacting the vegetable with air previously passed through a cooling apparatus during classifying, or
contacting the vegetable during classifying with air previously passed through a cooling apparatus and a drying apparatus,
wherein the air previously passed through a cooling apparatus comprises air at temperature of about 20° F. to about 60° F.; and
producing vegetable powder of which at least about 70% has a particle size less than 20 microns.

16. The method of claim 15, the method further comprising:
dehulling the millable vegetable, dehulling comprising:
dehulling vegetable having a mixture of sizes;
gently drying the vegetable and dehulling the gently dried vegetable;
dehulling at ambient temperature; or
a combination thereof; and
producing vegetable powder of which at least about 70% has a particle size less than 20 microns.

17. A method of producing vegetable powder, comprising:
dehulling the millable vegetable, dehulling comprising:
gently drying the vegetable and dehulling the gently dried vegetable, wherein gently drying comprises:
contacting the vegetable with air previously passed through a cooling apparatus, or
contacting the vegetable with air previously passed through a cooling apparatus and a drying apparatus,
wherein the air previously passed through a cooling apparatus comprises air at temperature of about 20° F. to about 60° F.; and
producing vegetable powder of which at least about 70% has a particle size less than 20 microns.

18. The method of claim 17, the dehulling further comprising:
dehulling vegetable having a mixture of sizes;
dehulling at ambient temperature; or
a combination thereof.

19. A system for producing vegetable powder comprising:
steaming apparatus, milling apparatus, classifying apparatus, vegetable handling apparatus, air cooling apparatus, air drying apparatus, and air handling apparatus;
the vegetable handling apparatus configured to transport the vegetable from the steaming apparatus to the milling apparatus and from the milling apparatus to the classifying apparatus;
the air handling apparatus configured to transport the air from the cooling apparatus and drying apparatus to the milling apparatus, to the vegetable handling apparatus between the milling apparatus and the classifying apparatus, and to the classifying apparatus.

20. The system of claim 19, wherein the steaming apparatus is configured to contact the millable vegetable with steam at a temperature of about 95° C. to about 130° C.

21. The system of claim 19, wherein the milling apparatus comprises air-swept pin mill.

22. The system of claim 19, wherein the milling apparatus and air handling apparatus are configured to maintain the vegetable powder at a temperature of about 10 to about 45° C.

23. The system of claim 19, wherein the milling apparatus and classifying apparatus are configured to produce a vegetable powder comprising particles 80% of which have size less than about 20 μm.

24. The system of claim 19, wherein the air cooling apparatus puts out air at a temperature of about 10 to about 70° F.

* * * * *